United States Patent
Miida et al.

(10) Patent No.: US 10,888,112 B2
(45) Date of Patent: Jan. 12, 2021

(54) PACKAGE OF FILTER TOW BALE PACKED WITH PACKING MATERIAL IN A NON-HERMETIC STATE AND MANUFACTURING METHOD THEREOF

(71) Applicant: Daicel Corporation, Osaka (JP)

(72) Inventors: Masataka Miida, Otake (JP);
Tomoharu Miyashita, Himeji (JP);
Masaharu Takekawa, Himeji (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 16/820,363

(22) Filed: Mar. 16, 2020

(65) Prior Publication Data

US 2020/0268041 A1    Aug. 27, 2020

Related U.S. Application Data

(62) Division of application No. 15/124,832, filed as application No. PCT/JP2015/056952 on Mar. 10, 2015, now Pat. No. 10,716,326.

(30) Foreign Application Priority Data

Mar. 11, 2014  (JP) .................. 2014-047592

(51) Int. Cl.
*B65D 71/00* (2006.01)
*B30B 9/30* (2006.01)
(Continued)

(52) U.S. Cl.
CPC ............. *A24D 3/0204* (2013.01); *A24D 3/04* (2013.01); *A24D 3/10* (2013.01); *B65B 27/125* (2013.01);
(Continued)

(58) Field of Classification Search
CPC ...... A01F 15/0825; A24C 5/475; A24C 5/465; A24D 3/0204; A24D 3/04; A24D 3/10;
(Continued)

(56) References Cited

U.S. PATENT DOCUMENTS

| 206,658 A | * | 8/1878 | Blossom | B30B 9/3021 |
| | | | | 100/295 |
| 678,134 A | * | 7/1901 | Parker | A24D 3/022 |
| | | | | 206/417 |

(Continued)

FOREIGN PATENT DOCUMENTS

EP    2407387 A1    1/2012
JP    48-33993 A1    5/1973
(Continued)

OTHER PUBLICATIONS

Machine translation of JP-2003-291912-A, dated Oct. 15, 2003.
(Continued)

*Primary Examiner* — Gideon R Weinerth
(74) *Attorney, Agent, or Firm* — Birch, Stewart, Kolasch & Birch, LLP.

(57) ABSTRACT

The present invention provides a package of a filter tow bale made of cellulose acetate packed with a packing material in a non-hermetic state, which can be stacked in multistage and in which tows in the same bale can be uniformly maintained. The package of the filter tow bale made of cellulose acetate is packed with the packing material in the non-hermetic state, in which the filter tow bale is tightened with the packing material in the package, the filter tow bale has a cubic shape or a rectangular parallelepiped shape with 800 to 1,400 mm in length, 800 to 1,150 mm in width, and 800 to 1,100 mm in height, and a packing initial pressure between a top surface of the filter tow bale and the packing material is 6.3 kPa or less.

4 Claims, 3 Drawing Sheets

(51) Int. Cl.
*B65B 27/12* (2006.01)
*A01F 15/00* (2006.01)
*A24D 3/02* (2006.01)
*B65D 85/07* (2017.01)
*A24D 3/04* (2006.01)
*A24D 3/10* (2006.01)
*A01F 15/08* (2006.01)

(52) U.S. Cl.
CPC .......... *B65D 85/07* (2018.01); *A01F 15/0825* (2013.01); *B65B 27/12* (2013.01)

(58) Field of Classification Search
CPC .... A24D 3/0229; A24D 3/0241; A24D 3/166; A24D 3/163; B30B 9/30; B65B 13/20; B65B 27/12; B65B 27/125; B65B 63/02; B65D 71/02; B65D 85/07
USPC ............... 131/345, 111; 493/50, 39, 42; 210/500.32, 500.3; 53/412, 433, 436; 206/83.5; 100/3, 35, 295
See application file for complete search history.

(56) References Cited

U.S. PATENT DOCUMENTS

| | | | |
|---|---|---|---|
| 705,134 A * | 7/1902 | Pope | B65B 27/12 100/3 |
| 864,975 A * | 9/1907 | Luce | D06M 7/00 206/417 |
| 1,468,130 A | 9/1923 | Angier | |
| 2,915,208 A | 12/1959 | Benschoter | |
| 3,063,363 A | 11/1962 | Lamb | |
| 3,099,952 A * | 8/1963 | Olaf | B65B 1/24 100/3 |
| 3,120,893 A | 2/1964 | Guenther | |
| 3,206,021 A | 9/1965 | Smith et al. | |
| 3,308,832 A * | 3/1967 | Stelzer | A24C 5/475 131/94 |
| 3,529,540 A | 9/1970 | Ferris | |
| 3,541,752 A * | 11/1970 | Ness Irving | B65B 1/24 53/436 |
| 3,910,181 A * | 10/1975 | Andrews | B65B 27/12 100/226 |
| 3,914,918 A | 10/1975 | Laird | |
| 3,991,670 A | 11/1976 | Stromberg | |
| 4,092,912 A | 6/1978 | Simich | |
| 4,157,754 A | 6/1979 | Bartsch et al. | |
| 4,162,603 A | 7/1979 | Stromberg | |
| 4,324,176 A | 4/1982 | McCormick | |
| 4,577,752 A | 3/1986 | Meredith, Jr. | |
| 4,746,011 A | 5/1988 | McNair, Jr. et al. | |
| 4,848,222 A | 7/1989 | Fleissner | |
| 5,201,266 A * | 4/1993 | Schmalz | B30B 9/30 100/218 |
| 5,623,811 A * | 4/1997 | Hirschek | B30B 9/30 100/215 |
| 5,732,531 A | 3/1998 | De Silva et al. | |
| 6,112,501 A * | 9/2000 | Pollock | B65B 63/02 100/218 |
| 6,120,182 A | 9/2000 | Koock | |
| 8,161,716 B2 | 4/2012 | Hibi et al. | |
| 9,289,013 B2 | 3/2016 | Taniguchi et al. | |
| 2004/0159658 A1 | 8/2004 | McLaughlin et al. | |
| 2004/0237810 A1* | 12/2004 | De Baat | B30B 9/30 100/218 |
| 2005/0161358 A1 | 7/2005 | Kern | |
| 2005/0284775 A1 | 12/2005 | McLaughlin et al. | |
| 2006/0243142 A1 | 11/2006 | Mullins et al. | |
| 2006/0249406 A1 | 11/2006 | Sanderson et al. | |
| 2008/0216674 A1 | 9/2008 | Bundren et al. | |
| 2009/0101525 A1 | 4/2009 | Bundren et al. | |
| 2011/0023898 A1 | 2/2011 | Hibi et al. | |
| 2011/0203228 A1 | 8/2011 | McLaughlin et al. | |
| 2012/0167785 A1 | 7/2012 | Mullins et al. | |
| 2015/0239586 A1 | 8/2015 | Caenen et al. | |
| 2017/0015492 A1* | 1/2017 | Miida | A24D 3/0204 |

FOREIGN PATENT DOCUMENTS

| | | |
|---|---|---|
| JP | 49-48487 | 5/1974 |
| JP | 50-85577 | 7/1975 |
| JP | 53-143497 | 12/1978 |
| JP | 59-118703 U | 8/1984 |
| JP | 64-26209 U | 2/1989 |
| JP | 2003-291912 A | 10/2003 |
| JP | 2005-528096 A | 9/2005 |
| JP | 2007-261656 A | 10/2007 |
| JP | 2008-539143 A | 11/2008 |
| JP | 2009-508764 A | 3/2009 |
| JP | 2009-155083 A | 7/2009 |
| JP | 2010-6379 A | 1/2010 |
| JP | 2010-254376 A | 11/2010 |
| JP | 2011-84343 A | 4/2011 |
| JP | 2011-213354 A | 10/2011 |
| JP | 2013-47121 A | 3/2013 |
| JP | 2013-173567 A | 9/2013 |
| WO | WO 2007/000937 A1 | 1/2007 |
| WO | WO 2007/001810 A1 | 1/2007 |

OTHER PUBLICATIONS

Machine translation of JP-2007-261656-A, dated Oct. 11, 2007.
Machine translation of JP-2010-6379-A, dated Jan. 14, 2010.
Machine translation of JP-2011-213354-A, dated Oct. 27, 2011.
Machine translation of JP-50-85577-U, dated Jul. 21, 1975.
Machine translation of JP-59-118703-U, dated Aug. 10, 1984.
Machine translation of JP-64-26209-U, dated Feb. 14, 1989.

* cited by examiner

[Fig. 1]
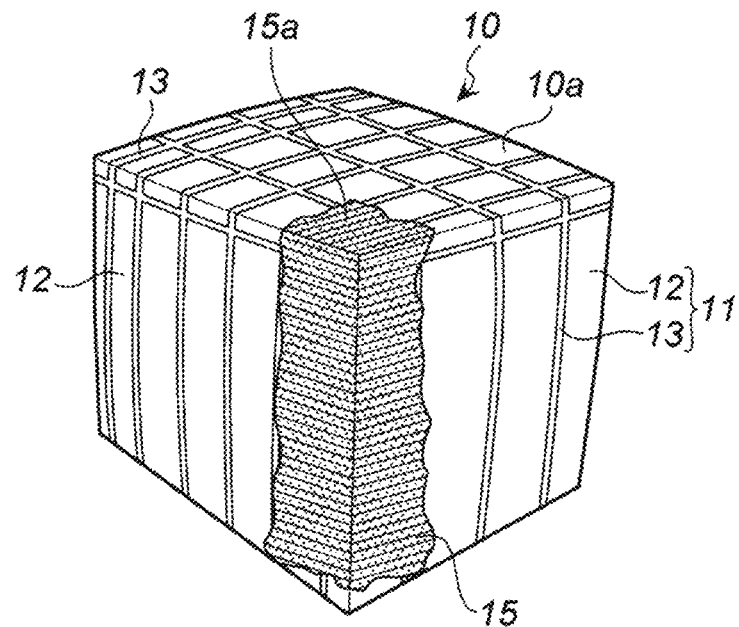
[Fig. 2]
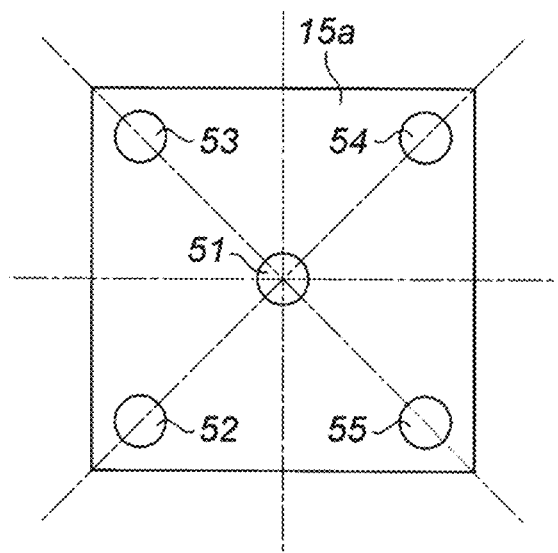

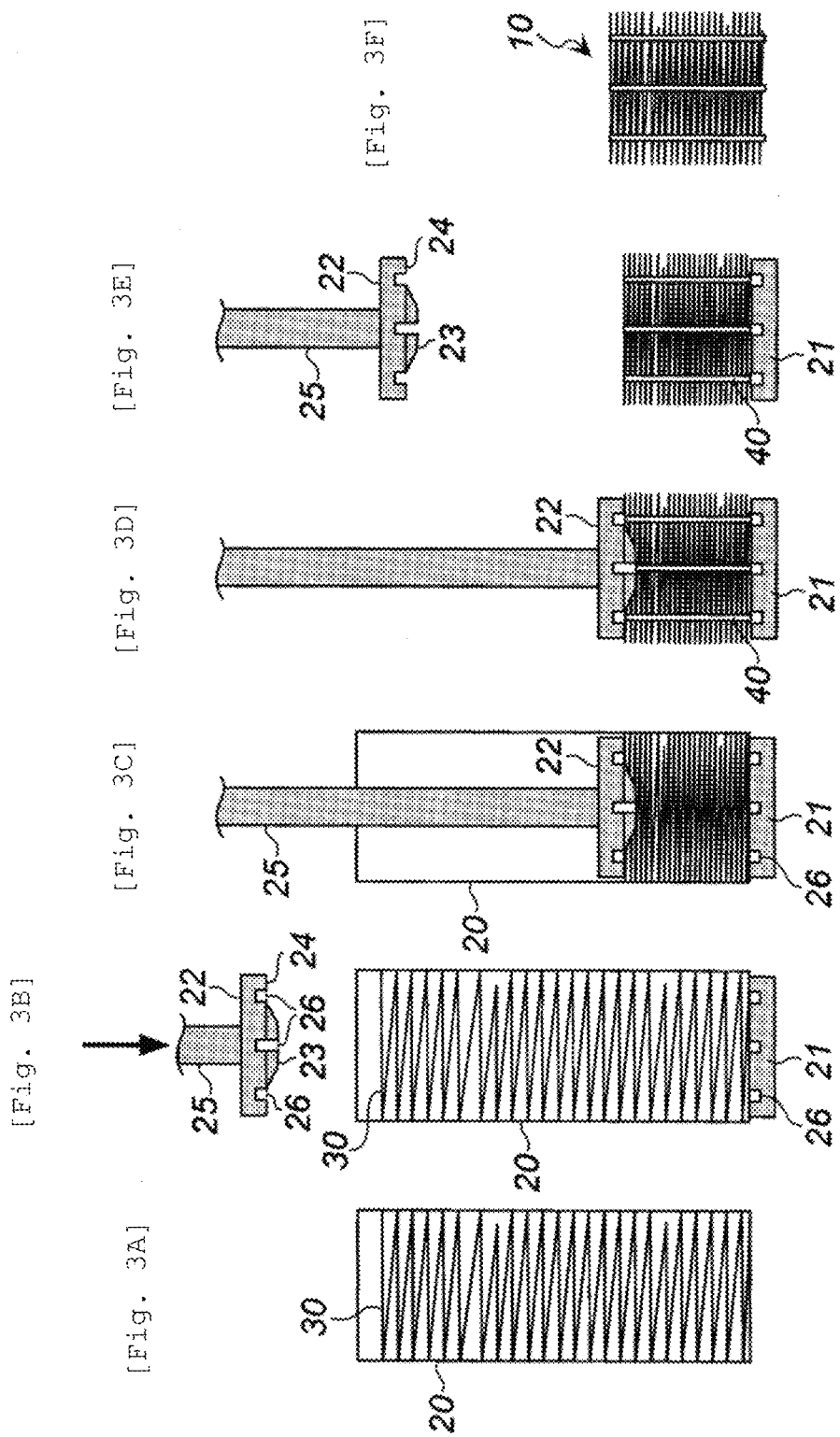

[Fig. 4A]
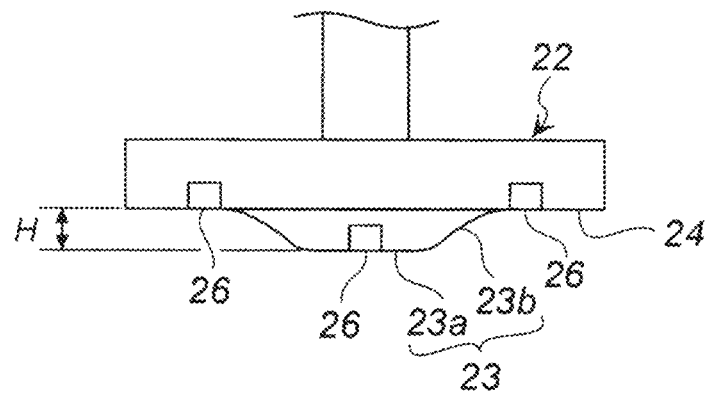
[Fig. 4B]
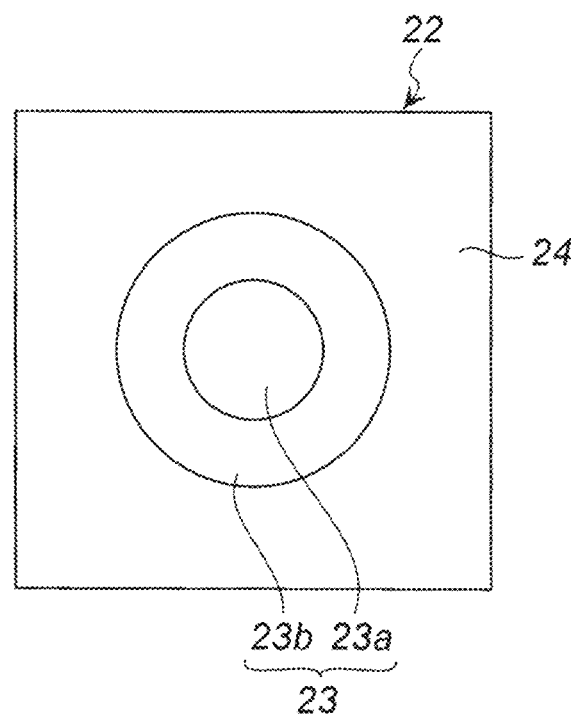

PACKAGE OF FILTER TOW BALE PACKED WITH PACKING MATERIAL IN A NON-HERMETIC STATE AND MANUFACTURING METHOD THEREOF

CROSS-REFERENCE TO RELATED APPLICATIONS

This application is a Divisional application of co-pending application Ser. No. 15/124,832, filed on Sep. 9, 2016, which is the National Phase under U.S.C. § 371 of International Application No. PCT/JP2015/056952, filed on Mar. 10, 2015, which claims the benefit under 35 U.S.C. § 119(a) to Patent Application No. 2014-047592, filed in Japan on Mar. 11, 2014, all of which are hereby expressly incorporated by reference into the present application.

FIELD OF THE INVENTION

The present invention relates to a package of a filter tow bale packed with a packing material in a non-hermetic state and a manufacturing method thereof.

BACKGROUND OF THE INVENTION

A bulky filter tow is packed in a state of compressed filter tow bale.

As packed tow bales are stored in a warehouse in a multistage stacked manner, a technology for facilitating the multistage stacking is provided.

In JP-A 2005-528096, there is disclosed a technology in which a tow bale is packaged with a plastic film and the inside of the tow bale is made to be in a negative pressure state, thereby allowing a top surface and a bottom surface of the tow bale to be flat surfaces.

In JP-A 2009-508764, there is disclosed an invention in which a fiber material is packaged after being compressed by use of a convex bale platen to manufacture a fiber bale.

As shown in FIG. 2 and FIGS. 3A-3F, the convex bale platen 18 has a shape in which the entire convex surface 20 is curved.

When the fiber material is compressed by using the convex bale platen 18 having the above shape, a central part of the fiber material is strongly compressed, and the compression in a peripheral part is low. Therefore, after releasing the compression, the degree of swelling in the central part is small and the swelling in the peripheral part is large. As a result, the entire surface becomes flat.

In JP-A 2008-539143, there is disclosed a method of compressing a fiber material by using a platen.

SUMMARY OF THE INVENTION

In the technology of JP-A 2005-528096, when the plastic film is broken at the time of works such as carrying the tow bales and stacking them in multistage, the inner negative pressure state cannot be maintained, and the flat surfaces cannot be maintained, either. Thus, it becomes difficult to perform multistage stacking.

In the bale obtained by the manufacturing method as in JP-A 2009-508764, the elastic recovery force differs in the central part and the peripheral part, therefore, filter tows having different physical properties are mixed in one bale.

Accordingly, for example, when tobacco filters are manufactured by using such bale as a raw material, a tension at which the tow is wound off from the bale varies. Thus, variation in mass per one filter is increased, which increases variation in quality of the filters.

The method of JP-A 2008-539143 has a similar problem with that of JP-A 2009-508764 as the platen itself used in the method of JP-A 2008-539143 has a similar shape to the convex bale platen in JP-A 2009-508764.

An object of the present invention is to provide a package of a filter tow bale packed with a packing material in a non-hermetic state which can be stacked in multistage and can reduce variation in quality of tows in the same bale, a filter plug for tobacco obtained from the filter tow bale of the package and a manufacturing method of the package packed in the non-hermetic state.

According to an embodiment of the present invention, there is provided a package of a filter tow bale made of cellulose acetate packed with a packing material in a non-hermetic state, in which:

the filter tow bale is tightened with the packing material in the package;

the filter tow bale has a cubic shape or a rectangular parallelepiped shape with 800 to 1,400 mm in length, 800 to 1,150 mm in width, and 800 to 1,100 mm in height; and a packing initial pressure between a top surface of the filter tow bale and the packing material is 6.3 kPa or less.

According to another embodiment of the present invention, there is provided a filter plug for tobacco formed of a filter tow bale obtained after removing the packing material from the package of the filter tow bale packed with the packing material in the non-hermetic state, in which:

the filter plug for tobacco has a variation in filtering resistance (PDCV) lower than 3.5 when it has a circumference of 20 to 25 mm and a density of 400 to 600 kg/cm$^3$; and the filter plug for tobacco has a variation in filtering resistance (PDCV) lower than 3.5 when it has a circumference of 18 mm or less and a density of 350 to 450 kg/cm$^3$.

According to further another embodiment of the present invention, there is provided a manufacturing method of the non-hermetic package of the filter tow bale including:

a first step of depositing a band of filter tow into a compression can in layers;

a second step of compressing the layers of the deposited filter tow band by pressing means composed only of a flat surface from an upper side so that an impulse (N·s) calculated from the following formula is 1,500 or more, a third step of packing the filter tow bale in an unsealed state with a packing material after stopping the compression by the pressing means and removing a cylindrical wall used for compression; and a fourth step of lifting the pressing means and releasing the filter tow bale from the pressure.

$$\text{Impulse (N·s)} = (\text{height of convex portion (mm)}/5.4 + 1) \times \text{force by pressing means at the time of compression (N=kg·m/s}^2) \times \text{compression time (s)}$$

According to further another embodiment of the present invention, there is provided a manufacturing method of the non-hermetic package of the filter tow bale, including:

a first step of depositing a band of filter tow into a compression can in layers;

a second step of compressing the layers of the deposited filter tow band by pressing means having a convex portion at a central part and a flat surface portion at a peripheral part from an upper side;

a third step of packing the filter tow bale in an unsealed state with a packing material after stopping the compression by the pressing means and removing a cylindrical wall used for compression; and a fourth step of lifting the pressing means and releasing the filter tow bale from the pressure.

The package of the filter tow bale packed with the packing material in the non-hermetic state according to the present invention can be stacked in multistage, in which a variation in quality of filter tows in the same bale is small.

Accordingly, the filter plug for tobacco according to the present invention obtained from the filter tow bale of the package has a small variation in filtering resistance.

BRIEF DESCRIPTION OF DRAWINGS

The present invention is understood by the following detailed description and attached drawings further completely, however, these drawings are attached only for explanation and do not limit the present invention.

FIG. 1 is a perspective view of a non-hermetic package of a filter tow bale according to the present invention. Note that the drawing is shown in a state where part of a packing material is removed so that the inside is seen.

FIG. 2 is an explanatory view of a measuring method of a packing initial pressure between a top surface of the filter tow bale and the packing material.

FIGS. 3A-3F are views for explaining a manufacturing method of the non-hermetic package of the filter tow bale according to the present invention.

FIG. 4A is a cross-sectional view of an upper pressing plate in a thickness direction used in the manufacturing method according to the present invention, and FIG. 4B is a plan view of the upper pressing plate. In the drawings, a reference numeral 10 denotes a package, a reference numeral 11 denotes a packing material, a reference numeral 12 denotes a covering material, a reference numeral 13 denotes a tightening material, a reference numeral 15 denotes a filter tow bale, a reference numeral 20 denotes a compression can, a reference numeral 21 denotes a lower pressing plate (lower platen), a reference numeral 22 denotes an upper pressing plate (upper platen), a reference numeral 23 denotes a convex portion, and a reference numeral 24 denotes an inclined surface.

DETAILED DESCRIPTION OF THE INVENTION

<Non-Hermetic Package of Filter Tow Bale>

A filter tow bale which is packed with a packing material in a non-hermetic state (hereinafter abbreviated as a "Package in a Non-hermetic State") according to the present invention is in a state where a filter tow bale made of cellulose acetate is tightened with a packing material, and has flat surfaces in such a degree that multistage stacking is possible.

The "non-hermetic state" in the present invention means that a filter tow bale is covered with a packing material in a state where the filter tow bale can be aerated, and the technology of utilizing the negative pressure as packaging means disclosed in the invention of JP-A 2005-528096 is not included.

Next, the Package in a Non-hermetic State according to the present invention will be explained with reference to FIG. 1.

In the Package in a Non-hermetic State 10, a filter tow bale 15 made of cellulose acetate is tightened with a packing material 11.

The filter tow bale 15 has a cubic shape or a rectangular parallelepiped shape with 800 to 1,400 mm in length, 800 to 1,150 mm in width and 800 to 1,100 mm in height.

As the packing material 11, a material containing a combination of a covering material 12 and a tightening material 13 can be used.

When the packing material 11 containing a combination of the covering material 12 and the tightening material 13 is used, the filter tow bale 15 is covered with the covering material 12 and is tightened with the tightening material 13 over the covering material 12 as shown in FIG. 1.

As the covering material 12, a material selected from a thin film, paper, a corrugated fiberboard, a synthetic resin sheet, a woven fabric, a non-woven fabric and combinations of these can be used.

When using a synthetic resin sheet, a woven fabric or a non-woven fabric as the covering material, a material to which stretchability is imparted by adjusting the thickness, material quality, weaving method and so on, may be used.

When using a material to which stretchability is imparted is used as the covering material, the covering material itself can also perform tightening by covering the tow bale in a state where the covering material is stretched.

As the tightening material 13, a synthetic resin band or a metal band can be used.

A packing material comprising a combination of the covering material and means for integrating the covering material may be used instead of the covering material 12 and the band 13 as the tightening material as shown in FIG. 1.

As the covering material, the same materials as described above can be used.

As the means for integration, means selected from a surface fastener, an adhesive and a heat seal can be used. The surface fastener performs integration of end portions of the covering material which are close to each other, and the adhesive and the heat seal perform integration of overlapped end portions of the covering material.

As the package 10 according to the present invention is in a non-hermetic state, it is not necessary that the filter tow bale 15 is completely covered with the covering material 12.

When the tow bale is completely covered with the covering material 12, a material having air permeability, or a material not having air permeability and having a vent hole is used as the covering material 12.

A packing initial pressure between a top surface 15a of the filter tow bale 15 and the packing material 12 is 6.3 kPa or less in the package 10.

Here, a "packing initial pressure" means a pressure after 10 minutes from the completion of packing (when a press pressure is released in FIG. 3E).

The "packing initial pressure" is measured by a method described in examples, and is n average value of pressures at the total of three points, which are a circle (circle mark) 51 including the center point of the top surface 15a, and two points of circles (circle marks) 52 to 55, as shown in FIG. 2.

While it is preferred that a central part and a peripheral part of a top surface 10a of the package 10 is flush with each other, the top surface 10a of the package 10 may have a central part being swollen as compared with a peripheral part as long as the degree of swelling is small.

In the case where the central part of the top surface 10a is swollen as compared with the peripheral part, the height of swelling at the central part is 25 mm or less when the peripheral part is taken as a reference. Even when the central part is swollen as described above, a work of multistage stacking can be facilitated as long as the degree of swelling can be made small.

Unlike the bales as described in the inventions of JP-A 2009-508764 and JP-A 2008-539143 in which the degree of swelling at the central part is small and the degree of swelling in the peripheral part is large to thereby form the flat surface, the package 10 according to the present invention has the central part being flush with the peripheral part or the central part being slightly swollen as compared with the peripheral part. Therefore, a variation in the elastic recovery force in the same tow bale 15 is small.

Accordingly, a fluctuation in tension is small when unwinding the tow from the tow bale 15, therefore, a fluctuation in mass per one filter is also small, thereby obtaining uniform filters.

The filter plug obtained by using the tow bale 15 of the package 10 according to the present invention has a variation in filtering resistance (PDCV) lower than 3.5 when it has a circumference of 20 to 25 mm and a density of 400 to 600 kg/cm$^3$, and the filter plug has a variation in filtering resistance (PDCV) lower than 3.5 when it has a circumference of 18 mm or less and a density of 350 to 450 kg/cm$^3$.

<Manufacturing Method of Package>

A manufacturing method of the package of the filter tow bale in the non-hermetic state will be explained with reference to FIGS. 3 (a) to (f).

[First Step]

In the first step, a band of filter tow is deposited into a compression can 20 in layers (layers of filter tow 30) as shown in FIG. 3A.

As a tow for filters, for example, a tow having the total denier of 15,000 to 45,000, in which 2,000 to 30,000 pieces of filaments having a filament denier of 1.5 to 8.2 are gathered, can be used.

When used as a production raw material of a tobacco filter plug, a tow for filters having different filament deniers can be used according to the width of the tobacco filter plug.

When used for the filter plug having a circumference of 20 to 25 mm and a density of 400 to 600 kg/cm3, a tow for filters having a filament denier of 2.0 to 3.5 and the total denier of 30,000 to 40,000 is preferred.

Further, when used for the filter plug having a circumference of 18 mm or less and a density of 350 to 450 kg/cm3, a tow for filters having a filament denier of 3.6 to 8.2 and the total denier of 30,000 to 40,000 is preferred.

After that, the compression can 20 filled with the layers of filter tow 30 is moved to a place where a lower pressing plate (lower platen) 21 and an upper pressing plate (upper platen) 22 are arranged opposite to each other in a height direction and placed on the lower pressing plate 21 as shown in FIG. 3B.

The lower pressing plate 21 is a flat plate.

A packing material (covering material) (not shown) and a synthetic resin band 40 serving as a tightening material are arranged on the lower pressing plate 21. The synthetic resin band 40 is inserted into a plurality of grooves 26 formed in the lower pressing plate 21.

The method itself in which a material corresponding to the packing material is previously arranged in pressing means is well known and described in, for example, JP-A 2010-254376 and shown in FIG. 2, and described in JP-A 2011-213354 and shown in FIG. 2 and FIG. 4.

[Second Step]

In the second step, the layers of filter tow 30 are compressed by the upper pressing plate 22 from an upper side as shown in FIG. 3C.

The upper pressing plate 22 can apply a pressure by a hydraulic rod 25.

The upper pressing plate 22 has a convex portion 23 in the central part and has a flat surface portion 24 in a peripheral part.

The convex portion 23 and the flat surface portion 24 have the plurality of grooves 26 for inserting the synthetic resin band 40, and the synthetic resin band 40 serving as the tightening material is inserted into the grooves 26.

In one example, the convex portion 23 is a mountain-like protrusion having an inclined surface or a stepped surface. That is, the convex portion 23 includes a flat top surface 23a and an inclined surface 23b as shown in FIGS. 4(a), (b). The inclined surface 23b may also be a stepped surface.

A height H of the convex portion 23 from the flat surface portion 24 is preferably 0 to 40 mm, and more preferably 5 to 40 mm and further preferably 10 to 38 mm.

As an area ratio between the convex portion 23 and the flat surface portion 24 in the upper pressing plate 22, an area of the convex portion 23 is preferably 95% or more, and more preferably, 98% or more.

As an area ratio between the top surface 23a and the inclined surface 23b in the convex portion 23, an area of the flat top surface 23a is preferably 10 to 40%, and more preferably, 15 to 30%.

In the second step, compression is performed so that an impulse (N·s) calculated from the following formula is preferably 1,500 N·s or more, and more preferably, 1,500 to 15,000 N·s.

Impulse (N·s)=(height of convex portion (mm)/5.4+1)×force by pressing means at the time of compression (N=kg·m/s$^2$)×compression time (s)

(5.4 and 1 in the formula are constants based on manufacture data accumulated for a long period of time, which indicate a known impulse (hereinafter "impulse 1") obtained from the force by the pressing means at the time of compression (N=kg·m/s$^2$)× compression time (s).)

In the second step, a plate composed only of a flat surface (not having the convex portion 23) can be used as the upper pressing plate 22.

When using the upper pressing plate 22 composed only of the flat surface, compression is performed so that a prescribed impulse is obtained.

[Third Step]

In the third step, as shown in FIG. 3D, after the compression by the upper pressing plate 22 is stopped, the compression can 20 used for compression is moved and removed, then, the filter tow bale 15 is packed with the packing material (only the synthetic resin band 40 is shown in the drawing) so that the filter tow bale 15 is in a non-hermetic state.

To stop the compression in the third step means to stop applying the pressure by the hydraulic rod 25. As the upper pressing plate 22 itself is in the state of FIG. 3D, the filter tow bale 15 is in a state where at least a pressure by an own weight of the upper pressing plate 22 is applied.

In the state shown in FIG. 3D, packing is performed so that a packing initial pressure between the top surface 15a of the filter tow bale 15 and the packing material 12 is 6.3 kPa or less.

[Fourth Step]

In the fourth step, the filter tow bale is released from the pressure by lifting the upper pressing plate 22 to thereby obtain the package 10 as shown in FIGS. 3E, 3F.

While the top surface 10a of the package 10 is a flat surface in the state shown in FIG. 3E obtained immediately after the upper pressing plate 22 is lifted, the central part of the top surface 10a may be slightly swollen with a lapse of time.

However, since a height of swelling at the central part at this time is 25 mm or less when the peripheral part is taken as a reference, the work of multistage stacking is facilitated.

EXAMPLES

Examples 1 to 7 and Comparative Examples 1 to 8

Packages of examples and comparative examples were fabricated by the steps shown in FIGS. 3A to 3F.

[First Step: FIGS. 3A, 3B]

A filter tow having a filament denier of 2.0 to 3.5 and the total denier of 30,000 to 40,000 was used.

The compression can 20 made of metal having a rectangular parallelepiped shape with 1,200 mm in a long edge, 950 mm in a short edge and 4,000 mm in height was used, and a filter tow of 625 kg was put into the can.

[Second Step: FIG. 3C]

As shown in FIG. 3C, the layers of tow 30 were compressed by the upper pressing plate 22 in compression conditions shown in Table 1 to obtain bales with a packing density of 550 kg/m3.

The upper pressing plate 22 composed only of the flat surface (the height (H) of the convex portion is 0 mm in Table 1) was used in the examples 1, 2 and the comparative examples 1 to 3.

In other examples, the upper pressing plate 22 having the convex portion 23 as shown in FIGS. 3A-3F was used. The heights (H) of the convex portions are shown in Table 1.

[Third Step; FIG. 3D]

After a compression time shown in Table 1 was passed, packing was performed by strapping bands from directions orthogonal to each other as shown in FIG. 1 so as to be in the non-hermetic state.

Two pieces of a film made of polyethylene resin and an inserting paper (the inserting paper is arranged in the outside) were used as the covering material 12, and five bands made of polyethylene-telephthalate resin (width 15 mm) were used as the synthetic resin band 13 (two bands in the same direction and three bands in orthogonal direction were used).

[Fourth Step; FIGS. 3E, 3F]

After the packing, the pressure was released to obtain the package 10.

The packing initial pressure of the package 10 was measured.

In addition, after allowing the obtained package 10 to stand for 24 hours at room temperature, a swelling on the top surface was measured. The swelling on the top surface was provided by placing a flat plate (10 kg) on the top surface and measuring distances between four corners and the flat plate to obtain an average value thereof.

<Measuring Method of Packing Initial Pressure>

Measurement was made by using a film-type sensor having 14 mm in width, 205 mm in length and 0.208 mm in thickness (a circle having a diameter of 9.5 mm at the tip of the sensor is an effective sensing area, the maximum loads 4.4 N and 110 N; pressure-voltage conversion type) (brand name: Flexi Force, manufactured by NITTA Corporation).

The measurement was made 10 minutes after the release of pressure in the step of FIG. 3E.

As the measurement method, the covering material was cut for approximately 20 mm in the vicinity of three points of the circle 51, the circle 53 and the circle 55 shown in FIG. 2, and measurement was performed by inserting the film-type sensor so that the effective sensing area (connected to an external circuit) was positioned at the circle 51, the circle 53 and the circle 55.

The synthetic resin band 13 does not exist at positions of the circle 51, the circle 53 and the circle 55.

Test Example 1 (Evaluation of Multistage Stacking Property)

Stability when stacking packages in four stages was evaluated by using the obtained packages. Wooden pallets were interposed between a floor surface and the lowermost package and between respective packages.

In the four-stage stacking as the above, states of contacts between the pallets interposed between respective packages and the top surfaces of the packages were observed by the naked eyes and evaluated. Packages in which the pallet contacts the top surface of the package were evaluated as "good," while packages in which the pallet does not contact the top surface even in a part were evaluated as "poor."

Text Example 2 (Evaluation of Pressure Drop when Processed into Tobacco Filter)

Pressure drop was evaluated when the tow bales of respective packages according to the examples and the comparative examples were used and processed into tobacco filters.

A tow of cellulose acetate fiber was opened or bloomed using a rod making machine for manufacturing tobacco filters (KDF2/AF1) to have approximately 5 cm to 20 cm in width, and after uniformly spraying 6 parts by mass of triacetin relative to 100 parts by mass of the tow, the tow was opened or bloomed with an air stream, introduced into a trumpet-shaped convergence tube, wound up using wrapping paper, and then cut by a cutter, thereby to obtain a filter.

A filter rod having a circumference of 24.2 mm and a length of 100 mm was obtained. The winding velocity was 600 m/min.

A pressure drop (mmWG) relating to the filter rod having the length of 100 mm was measured by using an automatic pressure drop measuring instrument ("QTM-6" manufactured by CERULEAN UK) in a condition of an air flow rate 17.5 ml/sec).

Average values (x) and standard deviations ($\sigma$) of the pressure drop (PD) were calculated from measurement data, and PDCV was calculated by a formula: $\sigma/x \times 100$.

Evaluations were indicated as "good" when PDCV was lower than 3.5 and evaluations were indicated as "poor" when PDCV exceeded 3.5. When PDCV is lower than 3.5, the smoking flavor obtained when using as the tobacco filter is not badly affected.

TABLE 1

| | Second step | | | | | Package | | Test result | |
|---|---|---|---|---|---|---|---|---|---|
| Convex portion (H) height (mm) | Pressing area (m²) | Compression pressure (MPa) | Compression time (second) | Impulse 1 | Impulse (H/5.4 + 1) × Impulse 1 | Packing initial pressure (MPa) | Swelling height (mm) | Multistage stacking property | PDCV |
| Example 1 | 0 | 1.13 | 3.5 | 600 | 1526 | 1,526 | 5 | 25 | Good | Good |
| Example 2 | 0 | 1.13 | 3.5 | 2100 | 4675 | 4,675 | 5 | 20 | Good | Good |
| Comparative Example 1 | 0 | 1.13 | 3.5 | 60 | 187 | 187 | 40 | 45 | Poor | Good |
| Comparative Example 2 | 0 | 1.13 | 3.5 | 240 | 666 | 666 | 25 | 30 | Poor | Good |
| Comparative Example 3 | 0 | 1.06 | 1.3 | 120 | 133 | 133 | 50 | 60 | Poor | Good |

TABLE 1-continued

| | Second step | | | | | Package | | Test result | |
| --- | --- | --- | --- | --- | --- | --- | --- | --- | --- |
| | Convex | | | | | Packing | | | |
| | portion (H) height (mm) | Pressing area (m²) | Compression pressure (MPa) | Compression time (second) | Impulse 1 | Impulse (H/5.4 + 1) × Impulse 1 | initial pressure (MPa) | Swelling height (mm) | Multistage stacking property | PDCV |
| Example 3 | 10 | 1.13 | 3.5 | 360 | 962 | 2,744 | 5 | 25 | Good | Good |
| Comparative Example 4 | 10 | 1.06 | 1.3 | 180 | 192 | 548 | 30 | 38 | Poor | — |
| Comparative Example 5 | 10 | 1.13 | 3.5 | 60 | 187 | 534 | 30 | 35 | Poor | — |
| Example 4 | 25 | 1.13 | 35 | 240 | 666 | 3,750 | 5 | 25 | Good | — |
| Comparative Example 6 | 25 | 1.13 | 35 | 60 | 187 | 1,054 | 15 | 35 | Poor | — |
| Example 5 | 38 | 1.13 | 3.5 | 60 | 187 | 1,504 | 5 | 25 | Good | Good |
| Example 6 | 38 | 1.13 | 3.5 | 240 | 666 | 5,353 | 5 | 20 | Good | Good |
| Example 7 | 38 | 1.13 | 3.5 | 600 | 1526 | 12,268 | 5 | 20 | Good | Good |
| Comparative Example 7 | 38 | 1.06 | 1.3 | 120 | 133 | 1,066 | 15 | 30 | Poor | Good |
| Comparative Example 8 | 60 | 1.13 | 3.5 | 60 | 187 | 2,267 | 5 | 25 | Good | Poor |

As apparent from Table 1, in packages according to the present invention, heights of swelling in the central part were low (25 mm or less), therefore, both the multistage stacking property and PDCV when processed into the tobacco filters were good.

From comparison between examples 1, 2 and examples 3 to 7, it was found that using the pressing means having the convex portion in the central part and the flat surface portion in the peripheral part was a preferable manufacturing method in consideration of the number of equipment needed at the time of manufacture as the compression time was reduced.

Examples 8 to 10 and Comparative Examples 9 to 13

Packages of examples and comparative examples were fabricated by steps shown in FIGS. 3(a) to (f).

[First Step; FIGS. 3(a), (b)]

Filter tows having filament deniers and total deniers shown in Table 2 were used.

The compression can 20 made of metal having a rectangular parallelepiped shape with 1,200 mm in a long edge, 950 mm in a short edge and 4,000 mm in a height was used, and a filter tow of 625 kg was put into the can.

[Second Step; FIG. 3C]

As shown in FIG. 3C, the layers of tow 30 were compressed by the upper pressing plate 22 in compression conditions shown in Table 1 to obtain bales with packing densities shown in Table 2.

The upper pressing plate 22 composed only of the flat surface (the height (H) of the convex portion is 0 mm in Table 1) was used in the example 9 and the comparative examples 9 to 11, 13.

In other examples, the upper pressing plate 22 having the convex portion 23 as shown in FIGS. 3A-3F was used. The heights (H) of the convex portions are shown in Table 1.

[Third Step; FIG. 3D]

After a compression time shown in Table 3 was passed, packing was performed by strapping bands from directions orthogonal to each other as shown in FIG. 1 so as to be in the non-hermetic state.

Two pieces of a film made of polyethylene resin and an inserting paper (the inserting paper is arranged in the outside) were used as the covering material 12, and five bands made of polyethylene-terephthalate resin (width 15 mm) were used as the synthetic resin band 13 (two bands in the same direction and three bands in orthogonal direction were used).

[Fourth Step; FIGS. 3E, 3F]

After the packing, the pressure was released to obtain the package 10.

The packing initial pressure of the package 10 was measured.

In addition, after allowing the obtained package 10 to stand for 24 hours at room temperature, a swelling on the top surface was measured. The swelling on the top surface was provided by placing a flat plate (10 kg) on the top surface and measuring distances between four corners and the flat plate to obtain an average value thereof.

Evaluation of the multistage stacking property of the test example 1 was made by using respective packages of the examples and the comparative examples. Results are shown in Table 3.

By a test example 2, pressure drop was evaluated when the tow bales of respective packages according to the examples and the comparative examples were used and processed into tobacco filters. A filter rod having a circumference of 16.5 mm and a length of 100 mm was fabricated and used in the test example 2. Results were shown in Table 3.

TABLE 2

| | Filament denier | Total denier | Packing density (kg/m³) |
| --- | --- | --- | --- |
| Example 8 | 6 | 17,300 | 450 |
| Example 9 | 6 | 17,300 | 400 |
| Example 10 | 6 | 17,300 | 350 |
| Comparative Example 9 | 3.1 | 29,800 | 500 |
| Comparative Example 10 | 6 | 17,300 | 400 |
| Comparative Example 11 | 6 | 17,300 | 390 |
| Comparative Example 12 | 6 | 17,300 | 400 |
| Comparative Example 13 | 6 | 17,300 | 500 |

TABLE 3

| | Second step | | | | | | Package | | Test result | |
|---|---|---|---|---|---|---|---|---|---|---|
| | Convex portion (H) height (mm) | Pressing area (m²) | Compression pressure (MPa) | Compression time (second) | Impulse 1 | Impulse (H/5.4 + 1) × Impulse 1 | Packing initial pressure (kPa) | Swelling height (mm) | Multistage stacking property | PDCV |
| Example 8 | 38 | 1.13 | 3.5 | 60 | 187 | 1,504 | 5 | 25 | Good | Good |
| Example 9 | 0 | 1.13 | 3.5 | 600 | 1,526 | 1,526 | 5 | 25 | Good | Good |
| Example 10 | 38 | 1.13 | 3.5 | 600 | 1,526 | 12,268 | 5 | 20 | Good | Good |
| Comparative Example 9 | 0 | 1.13 | 3.5 | 600 | 1,526 | 1,526 | 5 | 25 | Good | burst |
| Comparative Example 10 | 0 | 1.13 | 3.5 | 60 | 187 | 187 | 40 | 45 | Poor | Good |
| Comparative Example 11 | 0 | 1.06 | 1.3 | 120 | 133 | 133 | 50 | 60 | Poor | Good |
| Comparative Example 12 | 60 | 1.13 | 3.5 | 60 | 187 | 2,267 | 5 | 25 | Good | Poor |
| Comparative Example 13 | 0 | 1.13 | 3.5 | 60 | 187 | 187 | 60 | 60 | Poor | Poor |

As apparent from Table 3, heights of the swelling in the central part were low (25 mm or less) in the packages according to the present invention, therefore, both the multistage stacking property and PDCV when processed into the tobacco filter were good.

From comparison between example 8 and example 9, it was found that using the pressing means having the convex portion in the central part and the flat surface portion in the peripheral part was a preferable manufacturing method in consideration of the number of equipment needed at the time of manufacture as the compression time was reduced.

Furthermore, it was confirmed that, with the filter tows having different thicknesses (different filament deniers) used in the examples 1 to 7 in Table 1 and the examples 8 to 10 in Table 3, the same results were obtained by adopting the manufacturing method according to the present invention.

Variation in quality of filter tows in the same bale is small in the packages in which the filter tow bale is packed with the packing material in the non-hermetic state, therefore, the filter tow bale of the package can be used as the filter plug for tobacco.

The present invention has been described as the above. The present invention naturally includes various modifications in a range thereof, and these modifications do not depart from the range thereof. All regarded as modifications of the present invention by those who have normal knowledge in the technical field is included in the range of claims described below.

The invention claimed is:

1. A manufacturing method of a non-hermetic package of a filter tow bale, comprising:
   depositing a filter tow band into a compression can in layers to form a folded filter tow band;
   applying a force to the folded filter tow band in the compression can from an upper surface of the folded filter tow band by a compression plate to compress the folded filter tow band so that an impulse is 1,500 (N*s) or more, and
   removing the compression can from the folded filter tow band, while keeping compression by the compression plate, to obtain the filter tow bale, and then packing the filter tow bale in the non-hermetic state with the packing material, and
   releasing pressure by removing the compression plate from the filter tow bale, so that the filter tow bale is tightened with the packing material in the package, and the packing density of the filter tow bale is 350 kg/m² or greater, wherein the compression plate has a convex at a central part on a flat surface facing to the folded tow band, the convex having a height of 0 to 40 mm, the impulse is defined by a following calculation:
   the impulse (N–s)=(the height of the convex portion (mm)/5.4+1)×the force applied during the compression (N=kg-m/s²)×a compression time(s) wherein the pressure is released by removing the compression plate from the filter tow bale so that a packing initial pressure between a top surface of the filter tow bale and the packing material is 6.3 kPa or less.

2. The manufacturing method of the non-hermetic package of the filter tow bale according to claim 1, wherein, in the compression plate, a height of the convex portion from the flat surface is 5 to 40 mm.

3. The manufacturing method of the non-hermetic package of the filter tow bale according to claim 1, wherein, in the compression plate, the convex portion is a mountain-shaped protrusion including an inclined surface or a stepped surface.

4. The manufacturing method of the non-hermetic package of the filter tow bale according to claim 1, where the packing initial pressure is an average value of pressures measured at three positions including a center of the top surface of the filter tow bale and two portions at vicinity of the corners of the top surface of the filter tow bale 10 minutes after release of the pressure by the compression plate.

* * * * *